United States Patent [19]

Lyle et al.

[11] Patent Number: 4,962,490
[45] Date of Patent: Oct. 9, 1990

[54] ACOUSTIC LOGGING METHOD FOR DETERMINING THE DIP ANGLE AND DIP DIRECTION OF A SUBSURFACE FORMATION FRACTURE

[75] Inventors: W. D. Lyle; D. Michael Williams, both of Grapevine, Tex.

[73] Assignee: Mobil Oil Corporation, Fairfax, Va.

[21] Appl. No.: 467,109

[22] Filed: Jan. 18, 1990

[51] Int. Cl.$^5$ ............................................... G01V 1/40
[52] U.S. Cl. ........................................ 367/35; 367/69; 33/303
[58] Field of Search ................... 367/35, 69; 181/105; 33/303; 364/422

[56] References Cited

U.S. PATENT DOCUMENTS

| | | | |
|---|---|---|---|
| 3,369,626 | 2/1968 | Zemanek, Jr. | 367/69 |
| 3,668,619 | 6/1972 | Dennis | 367/69 |
| 3,718,204 | 2/1973 | Groenendyke | 367/69 |
| 3,728,672 | 4/1973 | Dennis et al. | 367/69 |
| 4,780,857 | 10/1988 | Lyle et al. | 367/35 |
| 4,781,062 | 11/1988 | Taylor | 73/152 |

FOREIGN PATENT DOCUMENTS 0232561 8/1987 European Pat. Off. .............. 367/69

OTHER PUBLICATIONS

"Automatic Computation of Dipmeter Logs Digitally Recorded on Magnetic Tapes", Moran et al., pp. 771–782, Petroleum Transactions, Jul. 1962.

*Primary Examiner*—Ian J. Lobo
*Attorney, Agent, or Firm*—Alexander J. McKillop; Charles J. Speciale; George W. Hager, Jr.

[57] ABSTRACT

A deviated borehole penetrating a subsurface formation and intersected by a formation fracture is surveyed with a borehole televiewer acoustic logging system. Relative fracture dip angle and dip direction calculated from such survey with respect to the borehole axis is transformed into a true fracture dip angle and dip direction with respect to the vertical of the earth's coordinate system.

3 Claims, 3 Drawing Sheets

ACOUSTIC LOGGING METHOD FOR DETERMINING THE DIP ANGLE AND DIP DIRECTION OF A SUBSURFACE FORMATION FRACTURE

BACKGROUND OF THE INVENTION

This invention relates to acoustic logging of boreholes and, more particularly, to a method for determining the true dip angle and direction of a subsurface formation fracture intersecting a deviated borehole.

In U.S. Pat. Nos. 3,668,619 to Dennis; 3,369,626 to Zemanek, Jr.; 3,718,204 to Groenendyke; and 3,728,672 Dennis et al, there are disclosed methods of and apparatus for scanning the walls of a borehole with acoustic energy. In these patents a borehole televiewer logging tool employs a transmitter and a receiver of acoustic energy which are rotated within the borehole. The transmitter is cyclically energized to provide a beam of acoustic energy pulses for scanning the walls of the borehole. Reflected acoustic pulses are received by the receiver between transmitted acoustic pulses and are converted to reflection signals for recording on an electron beam display device. A sweep signal is generated each time the acoustic energy beam is rotated through a 360° scanning pattern. Such sweep signal is applied to the horizontal deflection plates of the display device to sweep an electron beam horizontally across the face of the display device. The reflection signals are applied to the Z-axis of the display device to intensity modulate the electron beam as the beam is swept across the face of the display device to provide a picture which is a function of the time or distance from the transmitter and receiver to the wall of the borehole and of the acoustic reflectivity of the borehole wall.

In the above described patents the combination of transducer rotation along with vertical movement of the borehole televiewer logging tool along the length of the borehole results in a continuous spiral of the borehole wall being scanned. The resulting display is a picture of the acoustic reflectivity of the material forming the walls of the borehole at different depth points. This scanning of the borehole wall permits the determination of the actual configuration of the borehole. In addition, it permits the determination of anomalies which may exist at different depths in the borehole. For example, these anomalies may be a fault or a fracture in the formations traversed by the borehole.

In U.S. Pat. No. 4,780,857 to Lyle et al, there is disclosed an acoustic logging method employing a borehole televiewer logging system for determining fracture dip angle and dip direction from the location of the center of a fracture with respect to a vertical borehole and the peak amplitude and phase angle of the recorded borehole signal at the fracture location. However, if the borehole intersecting the fracture is deviated away from the vertical, it becomes necessary to correct the relative dip angle and dip direction for such borehole deviation effects in order to arrive at the true dip angle and true dip direction.

Others have described methods for correcting measured dip angle and dip direction for deviated boreholes. For example, in an article entitled "Automatic Computation of Dipmeter Logs Digitally Recorded on Magnetic Tapes" by Moran, Caufleau, Miller and Timmons published in the *Journal of Petroleum Technology*, July 1962, pgs. 771-782, there is described a method for correcting microresistivity dipmeter determined dip angle and dip direction. The microresistivity dipmeter employs three electrical pad devices spaced uniformly about a logging tool for the making of microresistivity measurements. From such measurements, three microresistivity dipmeter curves are recorded and used to identify depth displacements from which dip angle and dip direction are determined for deviated borehole effects. Since the Moran et al transformation is for an electrical pad type device, their determination of the transformation contains certain angle variables referenced to a single one of the pad electrodes. Since the borehole televiewer acoustic logging system does not employ electrical type measurements and pads, the Moran et al transformation may not be applied to transform the borehole televiewer relative dip angle and dip direction to true dip angle and dip direction.

In European patent application 0 232 561 to Rambow entitled "Borehole Televiewer Dipmeter" there is described a method for correcting relative dip angle and dip direction for borehole deviation by using both the borehole deviation and the earth's magnetic inclination in the vicinity of the borehole. This information is used to compute true dip angle and dip direction of the fracture by using Euler angle techniques, i.e., a predetermined series of matrix rotations.

It is a specific object of the present invention to provide a method that transforms relative dip angle and dip direction of a subsurface fracture intersecting a borehole into true dip angle and dip direction that has not heretofore been applied through prior art techniques to borehole televiewer acoustic logging data.

SUMMARY OF THE INVENTION

In accordance with the present invention, a deviated borehole penetrating a subsurface formation and intersected by a formation fracture is surveyed with a borehole televiewer acoustic logging system. Relative fracture dip angle and dip direction computed from such survey with respect to the borehole axis is transformed into a true fracture dip angle and dip direction with respect to the vertical of the earth's coordinate system.

More particularly, three perpendicular vector components representing a normal to the fracture plane are calculated from the relative fracture dip angle and dip direction. Borehole azimuth and deviation angles are determined, the azimuth angle being derived from an angle between the high side of the borehole and magnetic North. A matrix operator is calculated from the borehole azimuth and deviation angles which is used to transform the three perpendicular vector components of the normal to the fracture plane into three perpendicular vector components in the earth's coordinate system. The true fracture dip angle and dip direction are then calculated from the three perpendicular vector components in the earth's coordinate system.

DESCRIPTION OF THE PREFERRED EMBODIMENT

For the purpose of illustrating the type of borehole logging operation in which the true formation dip angle and dip direction determination method of the present invention best operates, a general description of the logging system shown in FIG. 1 will be first presented, following which details of the formation fracture true dip angle and dip direction determination will be described.

Figure 1:
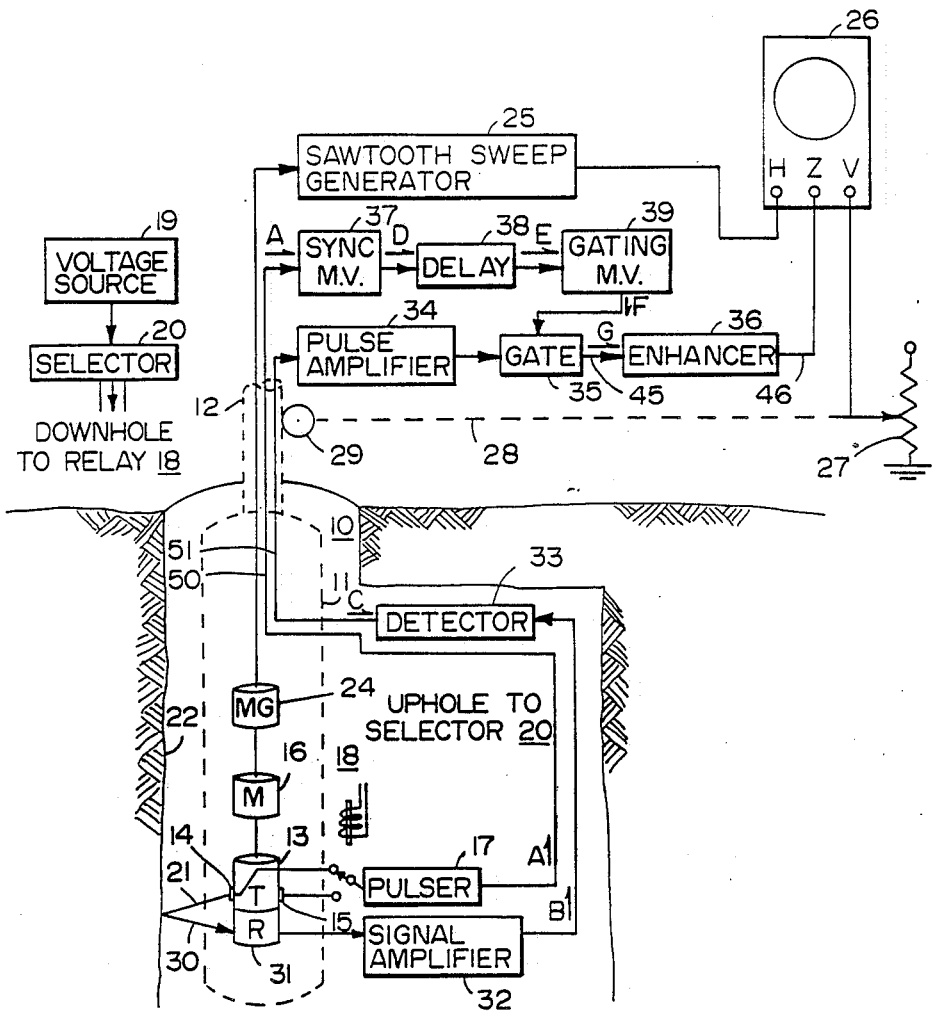
FIG. 1 illustrates a borehole televiewer acoustic logging system with which the true fracture dip angle and dip direction determination technique of the present invention may be employed.

Referring now to FIG. 1, there is illustrated one embodiment of a borehole televiewer logging system for carrying out acoustic reflectivity logging operations in a borehole 10. A borehole televiewer logging tool 11 is lowered into borehole 10 by means of a logging cable 12. Logging tool 11 comprises a transducer assembly 13 which acts as both a transmitter and receiver of acoustic energy. The beam of high frequency acoustic energy is rotated within the borehole to circularly scan the walls of the borehole. Such rotation is effected by means of motor 16. While it is understood that transducer assembly 13 comprises separate transmitter and receiver portions, a single transducer acting both as transmitter and receiver may be utilized. The transmitter portion of transducer assembly 13 consists of two transmitters 14 and 15 which are rotated about the borehole axis by means of motor 16. Pulser 17 is selectively applied to transmitters 14 and 15 by way of relay 18. Voltage is applied from voltage source 19 to relay 18 by way of selector 20. Selector 20 is a switch located uphole by which the polarity of the voltage to be applied to relay 18 is selected. A voltage polarity in one direction energizes relay 18 to connect the output of pulser 17 to transmitter 14. A polarity in the opposite direction energizes relay 18 to couple the output of pulser 17 to transmitter 15. Hence, only one transmitter, either transmitter 14 or transmitter 15, will be operative at any given time, the frequency of the acoustic energy transmitted by way of beam path 21 toward the wall 22 of borehole 10 being determined by the selector switch 20 whose setting determines which transmitter is coupled to pulser 17. Pulser 17 may, for example, produce in the order of 2,000 excitation pulses per second. Thereupon, transmitter 14, for example, will produce an acoustic energy burst rate in the order of 2,000 bursts per second. A suitable frequency of the pulses of each acoustic energy burst may be, for example, 2 megahertz.

Logging tool 11 also includes a magnetometer 24, mounted for rotation with the logging tool 11, which produces an output pulse each time magnetic North is detected by said magnetometer during rotation. Such magnetometer output pulse is applied uphole to sawtooth sweep generator 25 which provides a horizontal sweep signal to the horizontal deflection plates of an electron beam display device 26 for horizontally driving an electron beam across the face of display device 26.

Each horizontal sweep of the electron beam across the display device 26 is displaced vertically from the start of the sweep to the end of the sweep in proportion to the vertical movement of the logging tool 11 within the borehole 10. Such displacement is provided by means of a potentiometer 27 which is coupled by electromechanical linkage 28 to a sheave 29 over which logging cable 12 passes. Vertical advancement of logging cable 12 along the borehole axis rotates sheave 29, such rotation causing electromechanical linkage 28 to vary the location of the wiper arm on potentiometer 27, thereby applying to the vertical deflection plates of display device 26 a voltage which is proportional to the depth of the logging tool within the borehole. The resulting picture displayed on display device 26 is a series of side-by-side, substantially horizontal beams, the start of each beam trace located at the vertical position on the face of the display device where the preceding beam trace terminated.

Reflected acoustic energy pulses 30 are received by a receiver portion 31 of transducer assembly 13, and signals representative of such reflections are applied to the Z-axis of display device 26 by way of a signal amplifier 32 and detector 33, located downhole, and a pulse amplifier 34, gate 35, and enhancer 36 located on the surface of the earth. Such input to the Z-input terminal of display device 26 serves to intensity modulate the electron beam in accordance with the amplitudes of the reflection signals.

Ordinary logging cables are not suitable for transmission of high frequency signals, such as 2 megahertz, to the surface; therefore, after being amplified by signal amplifier 32, the reflection signals are applied to detector 33 which generates a lower frequency signal in the form of the envelope of the reflection signals. Such lower frequency signals, preferably in the range of 20–50 kilohertz, can be transmitted to the surface over ordinary logging cable without appreciable signal loss. The output of detector 33 is applied to the input of pulse amplifier 34 by means of conductor 51.

Pulser 17 also provides an output to a sync multivibrator 37, delay 38, and gating multivibrator 39. The output of gating multivibrator 39 is an indication of the time period between transmitted acoustic energy pulses and during which reflected acoustic energy pulses are expected to be received at receiver 31, such output being applied to gate 35 to allow reflecting signals to pass from pulse amplifier 34 through gate 35 and enhancer 36 to the modulating input of display device 26.

When pulser 17 generates an excitation pulse, a portion of this pulse cross-feeds into receiver 31. Also, when a sync pulse is generated by pulser 17 and sent uphole via conductor 50, a portion of the pulse cross-feeds into receiver conductor 51. To prevent these cross-feed signals from intensity modulating the electron beam of display device 26, gate 35 is open only during that portion of time during which reflected pulses are expected to be received from the walls of the borehole. Each time a sync pulse is received by sync multivibrator 37, it triggers into its unstable state for an output for a period of time almost as the time period between transmitted acoustic pulses. At the same time that the output of sync multivibrator 37 goes positive, a delay monostable multivibrator 38 is triggered into its unstable state for a period of time ending just prior to the anticipated arrival time of a reflected pulse at receiver 31. As the trailing edge of the output of delay multivibrator 38 goes negative, a gating monostable multivibrator 39 is triggered into its unstable state to generate a positive-going output, which triggers gating multivibrator 39 to provide a signal to gate 35 to allow passage therethrough of only those signals representative of reflected pulses. Therefore, only the envelopes of the reflection signals pass through gate 35 to enhancer 36.

Figure 2:
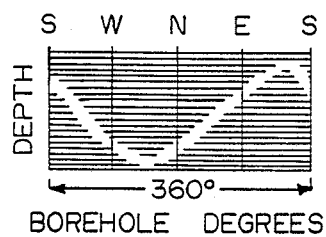
FIG. 2 illustrates a borehole televiewer log recorded by the system of FIG. 1 for a borehole intersected by a formation fracture.

These reflection signals represent two types of data. The amplitude of the reflection signal versus depth and azimuth, and the time of arrival of the reflection signal versus depth and azimuth. These reflection signals are presented on display device 26 as a two-dimensional, light-intensity function f(k,l) where k is a row (line) number on the display and l is a point (pixel) number on a line. The total number of lines in the image is L and the total number of pixels per line (equal to the total number of columns) is K. The value of f at spatial coordinates (k,l) of FIG. 2 is equal to the amplitude (or time of arrival) of the reflection signal received by the logging tool's receiver at azimuth k and depth l. This value f(k,l) will determine the intensity of the pixel (k,l) on the display. The monochrome image on the display consists of, for example 512 horizontal lines by 512 pixels per line. This represents 512 scan lines from NORTH to NORTH (N-N) and 512 events per rotation of the borehole logging tool. Very often monochrome images are translated to color images, color being assigned to each pixel based on its intensity. For example, blue color is usually assigned to low intensities, red color to high intensities, and the remaining rainbow colors to the in-between intensities.

The ideal logging conditions for producing such monochrome or color images is with the logging tool oriented vertically in the center of a borehole where the cross-section is a circle. Images generated by the logging tool in such ideal conditions contain nothing but desired information about the borehole wall.

Figure 3:
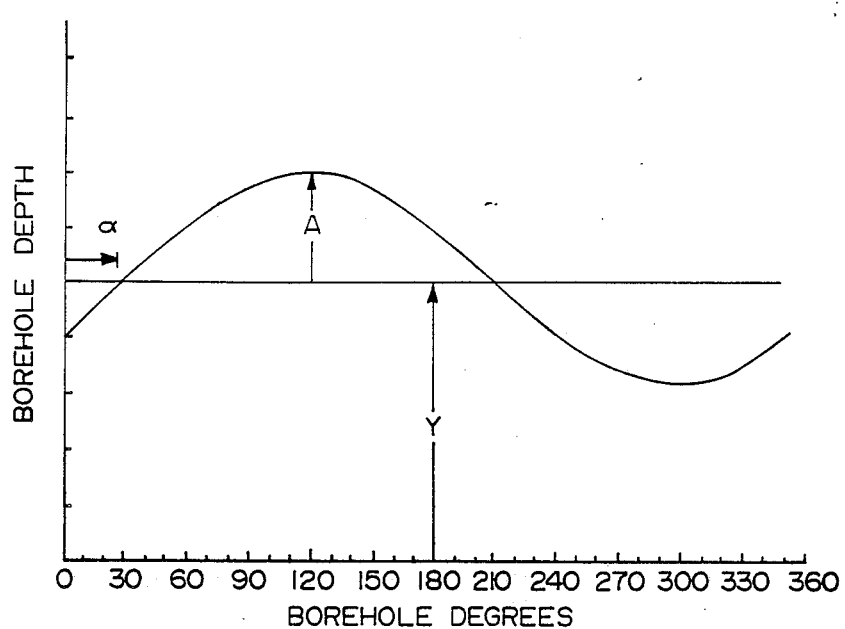
FIG. 3 depicts the sinusoidal format of a recorded formation fracture such as that of FIG. 2 with fracture location, sinusoid peak amplitude, and sinusoid phase.

It is well known, as noted in the aforementioned U.S. Pat. No. 4,780,857 to Lyle et al that a formation fracture intersecting a borehole is recorded as a sinusoidal wave on a borehole televiewer log as illustrated in FIG. 2. In FIG. 2, the absence of reflections in the receiver signals causes absence of registration of the electron beam on the display device 26. This absence of registration outlines the fracture as it passes through the borehole. The fracture dip angle is determined from the expression $$\theta = \tan^{-1} \frac{2A}{d} \tag{1}$$

where
$\theta$ = fracture dip angle
A = peak amplitude of the sinusoidal waveform
d = borehole diameter A borehole televiewer log over an interval, such as that illustrated in FIG. 1, can be represented in a manner amenable to mathematical analysis as illustrated in FIG. 3. In FIG. 3, the sine wave log output is digitized and represented by set of sample values $y_i$ given by $$y_i = Y + A \sin(\omega_o X_i - \alpha), \tag{2}$$

where $\alpha$ is a phase angle in radians, and Y is the location of the center of the fracture relative to some known point in the borehole.

The phase angle $\alpha$ is of interest since the dip direction (in degrees) is related to $\alpha$ (in radians) by $$\text{dip direction} = \frac{180\alpha}{\pi} - 90. \tag{3}$$

For more details as to the above described borehole televiewer acoustic logging system, as well as the technique for measuring dip angle and dip direction in a vertical borehole, reference may be made to the aforementioned Lyle et al patent, the teaching of which is incorporated herein by reference.

Turning now to the method of the present invention, there will be described a technique for the transformation of relative fracture dip angle and dip direction measured by a borehole televiewer acoustic logging system in a deviated borehole into true fracture dip angle and dip direction. Conventionally, the angle between the horizontal and the fracture plane is referred to as the fracture dip angle, while the direction of a normal line to the fracture plane with respect to magnetic North is referred to as the fracture dip direction. As described more fully in the aforementioned Moran et al article, this normal line is a vector having the following components along three perpendicular axes A, D and F in terms of polar angles:

$$N_A = \cos \theta, \tag{4}$$

$$N_D = \sin \theta \cos \phi, \text{ and} \tag{5}$$

$$N_F = \sin \theta \sin \phi \tag{6}$$

where
$\theta$ = relative dip angle, and
$\phi$ = relative dip direction.

Moran et al then proceeded to transform these three vectors into the earth's coordinate system by the following matrix expression:

$$\begin{bmatrix} N_V \\ N_N \\ N_E \end{bmatrix} = R \begin{bmatrix} N_A \\ N_D \\ N_C \end{bmatrix} \tag{7}$$

where V, N and E represent vertical, North and East directions respectively. From the values of $N_V$, $N_N$ and $N_E$ Moran et al determined the true dip angle $\theta'$ and true dip direction $\phi'$ from the following:

$$N_V = \cos \theta', \tag{8}$$

$$N_N = \sin \theta' \cos \phi', \text{ and} \tag{9}$$

$$N_E = \sin \theta' \sin \phi'. \tag{10}$$

Figure 4:
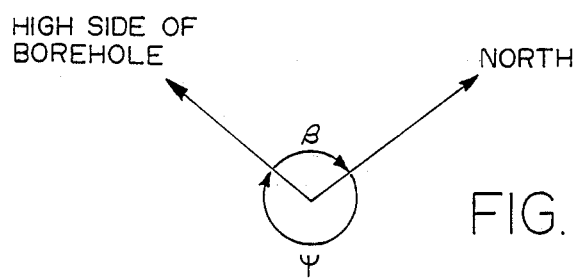
FIG. 4 is a pictorial representation of the relationship between the borehole and magnetic North utilized in the method of the present invention.

It is a specific feature of the present invention to utilize a matrix operator R in eq. (7) that takes into account that relative dip angle and dip direction measurements are being made with a borehole televiewer acoustic logging system as opposed to being made with the conventional dipmeter or microresistivity logging tool which reflects certain angle variables referenced to an electrode pad as described in Moran et al. Firstly, in accordance with the present invention, angles $\psi$ and $\delta$ are defined as follows:

$\psi$ = borehole azimuth (drift direction) and
$\delta$ = borehole deviation (drift angle),
where $\psi$ and $\delta$ are obtained from a conventional borehole deviation survey by letting angle $\beta$ be defined as the angle from the high side of the borehole to magnetic North as depicted in FIG. 4, then:

$$\psi + \beta = 360°, \quad (11)$$

which is equivalent in computation to:

$$\psi + \beta = 0° \text{ or} \quad (12)$$

$$\psi = -\beta. \quad (13)$$

Utilizing angles $\psi$ and $\delta$, an angle $\epsilon$ is defined as follows:

$$\epsilon = \text{Sgn}[\psi]^* \cos^{-1}[\cos\delta \cos\psi/(\cos^2\delta\cos^2\psi + \sin^2\psi)^{\frac{1}{2}}], \quad (14)$$

where $$\text{Sgn}[\psi] = \begin{cases} 1, \psi > 0 \\ 1, \psi = 0 \\ -1, \psi < 0 \end{cases}. \quad (15)$$

Using angles $\delta$, $\psi$ and $\epsilon$, a matrix operator R for use in equation (7) for a borehole televiewer dip angle and dip direction transformation in accordance with the present invention can now be expressed as follows:

$$R = \begin{bmatrix} \cos\delta & \sin\delta\cos\psi & \sin\delta\sin\psi \\ -\cos\xi\sin\delta & \cos\xi\cos\delta\cos\psi & \cos\xi\cos\delta\sin\psi \\ & + \sin\xi\sin\psi & -\sin\xi\cos\psi \\ -\sin\xi\sin\delta & \sin\xi\cos\delta\cos\psi & \sin\xi\cos\delta\sin\psi \\ & -\cos\xi\sin\psi & +\cos\xi\cos\psi \end{bmatrix} \quad (16)$$

After having computed the matrix operator R for a borehole televiewer acoustic logging operation, the earth coordinate vectors $N_V$, $N_N$ and $N_E$ may be calculated in accordance with equations (4)–(7). Finally, the true fracture dip angle $\theta'$ and dip direction $\phi'$ can be calculated using these earth coordinate vectors as follows:

$$\theta' = \cos^{-1}(N_V) \text{ and} \quad (17)$$

$$\phi' = \text{Sgn}(N_E)^* \cos^{-1}(N_N/\sin\theta'). \quad (18)$$

Figure 5:
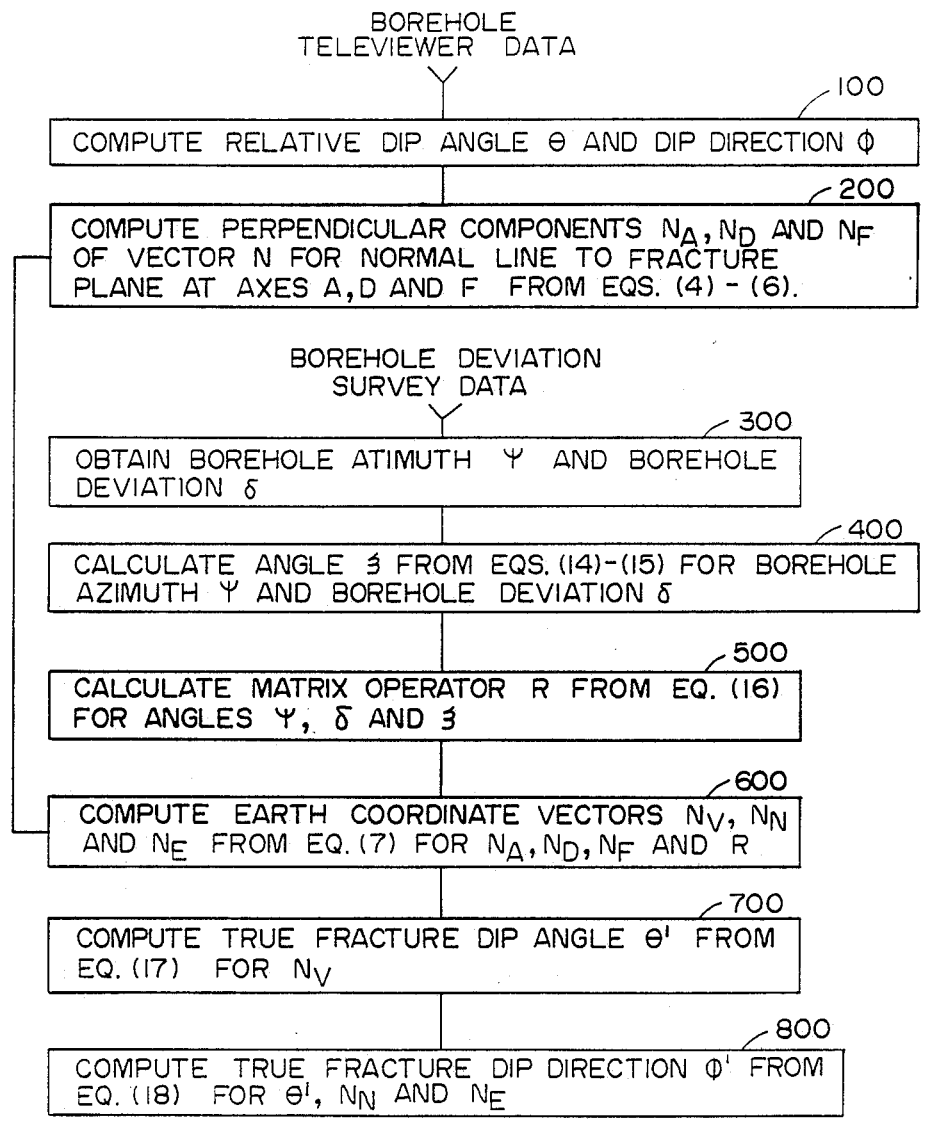
FIG. 5 is a flow chart depicting the steps of an algorithm for carrying out the transformation of relative dip angle and dip direction to true dip angle and dip direction from measurements made with a borehole televiewer acoustic logging system in accordance with the present invention.

Referring now to FIG. 5 there is shown a flow chart depicting the steps of an algorithm for carrying out the method of the present invention utilizing the expressions of the above equations to transform relative fracture dip angle and direction to true fracture dip angle and direction for measurements of a borehole televiewer acoustic logging operation taken in a deviated borehole.

At step 100, relative dip angle $\theta$ and dip direction $\phi$ are computed for a borehole televiewer acoustic logging operation in accordance with the teaching of aforementioned U.S. Pat. No. 4,780,857. At step 200 the three perpendicular vector components $N_A$, $V_D$ and $N_F$ of vector N for the normal line to the fracture plane at axes A, D and F are computed in accordance with eqs. (4)–(6) respectively from the relative dip angle $\theta$ and dip direction $\phi$ computations. At step 300 the borehole azimuth angle and borehole deviation angle $\delta$ are obtained from borehole deviation survey data. At step 400 the angle is calculated in accordance with eqs. (14)–(15) for borehole azimuth $\psi$ and borehole deviation $\delta$ obtained from step 300. At step 500 a matrix operator R is calculated from eq. (16) for angles $\psi$, $\delta$ and $\epsilon$. At step 600, earth coordinate vectors $N_V$, $N_N$ and $N_E$ are computed from eq. (7) for vectors $N_A$, $N_D$ and $N_F$ and the matrix operator R. At step 700 the true fracture dip angle $\theta'$ is computed from eq. (17) for vector $N_V$. Finally, at step 800 the true fracture dip direction $\phi'$ is computed from eq. (18) for the calculated true dip angle $\theta'$ and the vectors $N_N$ and $N_E$.

We claim:

1. A method for determining the dip angle and dip direction of a formation fracture intersecting a borehole, comprising the steps of:
   (a) conducting a borehole televiewer acoustic logging survey of the formations surrounding a borehole and intersected by a formation fracture,
   (b) determining the relative fracture dip angle and dip direction with respect to the borehole axis from said borehole logging survey,
   (c) calculating from said relative dip angle and dip direction three perpendicular vector components representing a normal to the fracture plane,
   (d) determining a borehole azimuth angle $\psi$ and a borehole deviation angle $\delta$, said borehole azimuth angle $\psi$ being a drift direction of the borehole represented by 360° minus the angle between the high side of the borehole and magnetic North, and said borehole deviation angle $\delta$ being a drift angle of deviation of the borehole from a vertical,
   (e) combining said borehole azimuth angle $\psi$ and said borehole deviation angle $\delta$ to yield a new angle $\epsilon$ as follows:

$$\epsilon = \text{Sgn}[\psi]^* \cos^{-1}[\cos\delta \cos\psi/(\cos^2\delta\cos^2\psi + \sin^2\psi)^{\frac{1}{2}}],$$

where $$\text{Sgn} = \begin{cases} 1, \psi > 0 \\ 1, \psi = 0 \\ -1, \psi < 0 \end{cases},$$

$\psi$ = borehole azimuth angle, and
   $\delta$ = borehole deviation angle
   (f) calculating a matrix operator R from said borehole azimuth angle $\psi$, said deviation angle $\delta$ and said angle $\epsilon$ which transforms the three perpendicular vector components of said normal to the fracture plane to three perpendicular vector components in the earth's coordinate system,
   (g) calculating said vector components in the earth's coordinate system from said matrix operator and said vector components of the normal to the fracture plane, and
   (h) calculating true fracture dip angle and dip direction from said vector components in the earth's coordinate system.

2. The method of claim 1 wherein said matrix operator R is calculated as follows:

$$R = \begin{bmatrix} \cos\delta & \sin\delta\cos\psi & \sin\delta\sin\psi \\ -\cos\xi\sin\delta & \cos\xi\cos\delta\cos\psi + \sin\xi\sin\psi & \cos\xi\cos\delta\sin\psi - \sin\xi\cos\psi \\ -\sin\xi\sin\delta & \sin\xi\cos\delta\cos\psi - \cos\xi\sin\psi & \sin\xi\cos\delta\sin\psi + \cos\xi\cos\psi \end{bmatrix}.$$

3. The method of claim 2 wherein said true fracture dip angle $\theta'$ and dip direction $\phi'$ are calculated as follows:

$\theta' = \cos^{-1}(N_V)$ and
$\phi' = \text{Sgn}(N_E) * \cos^{-1}(N_N/\sin\theta')$, where $N_V$, $N_N$ and $N_E$ represent the three vector components of the normal to the fracture plane or transformed into the earth's coordinate system by the calculated matrix operator R.

* * * * *

UNITED STATES PATENT AND TRADEMARK OFFICE
CERTIFICATE OF CORRECTION

PATENT NO. : 4,962,490

DATED : October 9, 1990

INVENTOR(S) : Lyle et al.

It is certified that error appears in the above-identified patent and that said Letters Patent is hereby corrected as shown below:

Col. 8, line 38: "$\epsilon$" should be -- $\xi$ --.

Col. 8, line 41, equation: "$\epsilon$" should be -- $\xi$ --.

Col. 8, line 41, equation: insert -- $\delta$ -- after "$\cos^2$".

Col. 8, line 56, "$\epsilon$" should be -- $\xi$ --.

Signed and Sealed this

Seventeenth Day of March, 1992

Attest:

HARRY F. MANBECK, JR.

*Attesting Officer*  *Commissioner of Patents and Trademarks*